Feb. 13, 1962 W. W. YOUNG ET AL 3,020,770
SERVO MOTOR CONTROL
Filed Jan. 17, 1958 3 Sheets-Sheet 1

Inventors
William W. Young
Harold B. Wetmore
by Roberts, Cushman & Grover
Attys.

Inventors
William W. Young
Harold B. Wetmore
by Roberts, Cushman & Grover,
Attys.

Inventors
William W. Young
Harold B. Wetmore
by Roberts, Cushman & Grover
Attys.

United States Patent Office 3,020,770
Patented Feb. 13, 1962

3,020,770
SERVO MOTOR CONTROL
William W. Young, Hingham, and Harold B. Wetmore, Needham, Mass., assignors to Waltham Precision Instrument Company, Inc., Waltham, Mass., a corporation of Massachusetts
Filed Jan. 17, 1958, Ser. No. 709,493
13 Claims. (Cl. 74—5.47)

This invention relates to control means for electrical servo motors, and while it is of more general utility it is especially suitable for the control of torque motors in gyroscopic systems.

In industrial control systems it is often desirable to vary the output of a component such as a servo motor dependent on two distinct conditions of operation of the system, while also distinguishing between two senses of operation for each condition.

The nature of such requirements as constituting a problem which is solved by the present invention will become apparent from a brief consideration of the conditions prevailing in gyroscopic systems, to which the invention is particularly applicable and which will serve for the disclosure of a specific embodiment thereof.

Conventional vertical gyroscope systems incorporate two axes of gimbal freedom which axes are, in the normal erect position of the gyroscope, orthogonal to each other and to the gyroscope rotor spin axis. In this erect position the spin axis is parallel to the vector of the gravitational field, with or without modification by an inertial vector. When a gyroscope of this type is started and is brought into correct operational condition or when the spin axis has subsequently become disturbed from its normal operational position, it becomes necessary to erect the spin axis into a position parallel to the vector to which it responds. Various means for such erection are available and one such conventional means employs gravity responsive impedances which are held rigidly fixed with respect to the spin axis and which control currents flowing in control windings of electrical torque motors which are mechanically coupled to respective gimbal axes to cause erection of the spin axis by way of the phenomenon of gyroscopic precession. One such system of the nature of a closed servo loop is provided for each of the two gimbal axes, and torquing of these axes occurs until the differential signals from the reference impedances are reduced to zero at which time the differential torques from the torque motors are also reduced to zero and the spin axis is parallel to the vector.

In systems of this type the rate of erection or correction generally, is important, because it is often important that abnormally speedy correction takes place when the deviation from the normal condition is abnormally great. Adjustability of the rate of correction dependent upon the amount of deviation is desirable because a rapid erection rate leads to systems which are less sensitive and more prone to hunting than those with a slower erection rate whereas, on the other hand, slow correction rates introduce dangerously long delays between the occurrence of a large deviation and the re-establishment of the normal condition.

Generally speaking, the signal delivered by the vertical reference element which indicates the deflection will be proportional to, or at least a predictable function of, the deflection itself, but in most practical instances this proportionality ends at a given deflection value above which the signal becomes constant. In the herein described embodiment of the present invention in gyroscopic systems, the angle of deflection of the spin axis from the gravity vector is indicated by means of a so-called vertical reference switch which may be of the heavy pendulum type or of the light bubble electrolytic type and changes signal controlling impedances with changes of the angle of deflection. In devices of this character the control signal output is proportional to the angle of deflection of the switch reference axis only for small angles of deflection. For larger angles of deflection the signal does not increase but remains constant as of the maximum value of its proportionately changing range. The above mentioned torque motors are usually of the two phase type and have a reference winding in one phase and a control winding in the other phase which latter winding discriminates by way of two sections between the two torque directions. It has been proposed to provide for fast erection of the gimbals through large angles by applying a high voltage to the reference winding, and a high voltage to the control winding independent of the vertical reference switch, whereas for maintaining verticality of the spin axis during normal and prolonged operation of the gyro a relatively low voltage is applied to the reference winding and a low voltage to the control winding the magnitude of which is a function of the degree of verticality of the reference switch.

System condition detecting and signal sending instrumentalities of the above outlined nature inherently present a relatively high electrical impedance to the passage of current into that section of the servo motor control winding which is effective for restoring the normal condition at that time, whereas at the same time the other side of the supervising impedance continues to allow current to flow to the other section of the torque motor control winding which is supposed to be inactive at that time, thus producing an undesired reverse torque. Since for a given value of restorative effect the maximum of fast erection rate obtainable is limited by the maximum torque generating ability of the torque motor system which in turn is limited by the torque motor size and by weight considerations, the further limitation of the restoring effect by the above outlined operation of the signal sending device are inherently detrimental. While such conventional arrangements produce satisfactory performance for many applications, it is often desirable to apply much higher fast erection rates for short periods of time than are obtainable with conventional systems, but to retain the desirable normal erection rate performance characteristic, and to accomplish all this without the use of larger or heavier torque motors.

Objects of the present invention are to provide control systems of the above described type which effect the application of a fast erection torque of any desirable magnitude to servo motors of systems of the above indicated type, regardless of limitations of the signal sending apparatus and without weakening of the control effect in a given sense by energy working in the opposite sense, to provide systems of this type wherein the energy available from a servo component such as a torque motor is independent of the electrical characteristics of the condition detecting and control signal dispatching component of the system, to provide such a system which is controlled from gravity repsonsive devices of the type of the so-called electrolytic vertical reference switches having two impedance branches in each control loop, wherein the control effect is wholly independent of that impedance branch which is at that time irrelevant to the desired correctional effect, to provide such a system which is able to effect much higher fast erection rates for short periods of time than are obtainable with heretofore proposed systems but which retains the desirable normal erection rate performance characteristics, without the use of larger or heavier torque motors, to provide such a system which produces all the desirable characteristics of heretofore known simple electrolytic vertical reference switch systems for the control of torque motors for normal erection of a gyro during normal operation, but which also produces a superfast erection rate through maximum utilization of the torque generating ability of the torque motor, and to provide a phase discriminatory amplifying system which responds with certainty to the phase and amplitude of an alternating current signal and which is capable of applying correctional energy to a servo motor, such as a gyro erecting torque motor, of any desirable magnitude, at high efficiency, and without torque decreasing reverse energy.

A brief summary of the invention serving to indicate its nature and substance in some of its principal aspects for attaining the above objects is as follows.

In accordance with the invention, a signal means of the variable impedance type is normally operative to deliver a preponderance of current directly to one or the other of control windings of a polyphase electric servo motor to determine the presence and direction of motor torque, is combined with control means operative to supply electric energy of a magnitude higher to any desirable degree, such as of higher voltage, than that normally delivered by the signal means directly to a control winding, these control means becoming operative upon delivery thereto by the signal means of a current preponderance exceeding a predetermined value; in a preferred embodiment the energy supply to the control winding that is effective in opposite direction is concomitantly disconnected.

In another important aspect of the invention a phase sensitive amplification system is utilized which derives from a position sensitive signal means alternating current signals of opposite phase one of which signals has a preponderant magnitude corresponding to a prevailing sense of deviation; in a preferred embodiment, the amplifying system is also sensitive to a voltage reference signal which is added to or subtracted from the voltage of respective deviation indicating signals of opposite phase. This amplifying system delivers two actuating signals one of which exceeds a predetermined value and corresponds to a position of change in a selected sense, whereas the signal in the opposite sense is below that given value, so that one or the other signal can be utilized to operate auxiliary apparatus that responds only to an input energy above that given value.

In a preferred embodiment which represents an important aspect of the invention, the above characterized discriminative amplification system is inserted between gyroscopic apparatus and a signal means of the electrolytic vertical reference switch type with two impedance branches one of which diminishes whereas the other increases upon positional changes in a given direction, such that the signal coming from the impedance branch which represents a selected direction of positional change actuates relay means for applying to a servo motor of the gyroscopic apparatus, such as a torque motor, energy for fast correction of the positional change quite independently of the positional signal itself and without opposing energy in the opposite sense.

These and other objects and aspects of novelty of the invention will appear from the herein presented outline of its principle and mode of operation together with a detailed description of a practical embodiment illustrating its novel characteristics.

The description refers to drawings in which

It will be noted that decimal numerals are herein used for denoting members of a group with similar function or components of an assembly or subassembly, and that the common integer numeral is sometimes used for shortly and significantly denoting several members of the group or assembly.

The description will first outline the construction of the system as a whole, then explain the phase sensitive amplifying system herein used, and finally relate the operation of the system.

Outline of the system

Figure 1:
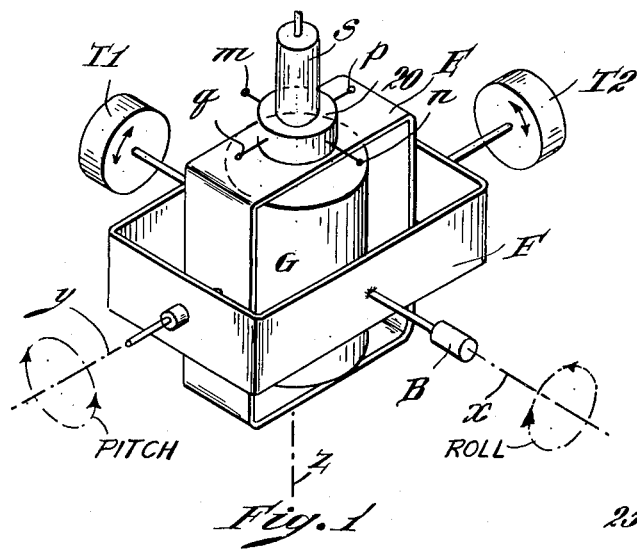
FIG. 1 is a diagrammatical representation of a gyroscopic system to which the present invention is applied.

FIG. 1 shows schematically a gyroscopic system of the type which has been shortly characterized above. In this figure, G is the gyro proper which rotates about the spin axis $z$ on its frame E which can rotate about the gimbal axis $y$ on the gimbal frame F which in turn can rotate about the second gimbal axis $x$ which is indicated as pivoted on a bearing B fixed to a suitable support. The torque motors T1 and T2 are indicated by their rotors T1 and T2 which are fixed to the gimbal axes $x$ and $y$ respectively. Fixed to the gyro frame E is a vertical reference switch S which is in principle illustrated in FIG. 2 as consisting of a heavy pendulum device V suspended at $o$ where it may be grounded or connected to a current source and which plays with a contact $s$ over an impedance $i$, for example a conventional rheostat winding with terminals $m$ and $n$. A widely used form of this type of direction sensitive detecting device known as electrolytic vertical reference switch is schematically shown in FIGS. 3 and 4. In these figures, 21 is a mounting plate made of insulating material to which is fastened a metallic shell 22 which is grounded or connected to a current source at $o$. Between mounting plate and shell is an electrolytical liquid 23 forming a bubble 24. Metallic detector plates 25.1 to 25.4 are on one side embedded in the plate 21, contact the liquid on the other side, and lead to terminals $m, n$ and $p, q$ respectively. As the gyro frame E deviates from the normal spin axis or gravity vector $z$, the bubble 24 changes its position and the resistance of the branches between $o$ and $m$ and $n$, and $o$ and $p, q$, respectively, varies in the manner which will now be obvious from FIG. 2. The device is oriented with respect to the supporting object for example a ship or airplane such that $m, n$ is parallel to the axis $x$ (FIG. 1) and represents the pitching movement, whereas $p, q$ represents the roll axis. It will be evident that the systems which rotate on axes $x$ and $y$, respectively, in this instance the roll and pitch axis, could be represented by two spatially separated systems each one made according to FIG. 2, and that the systems $m$—$n$ and $p$—$q$, of FIGS. 3 and 4, can be separately treated in similar manner.

Figure 2:
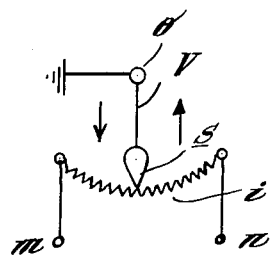
FIG. 2 is a generalized diagram of the position and sense of direction responsive signal means which is utilized in the herein described embodiment of the invention.
Figure 3:
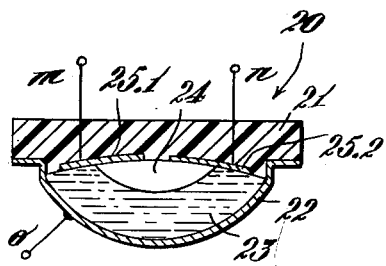
FIGS. 3 and 4 are a schematical cross section and a top view with the cover removed, respectively, of a so-called electrolytic vertical reference switch which is especially suited for purposes of the invention.
Figure 4:
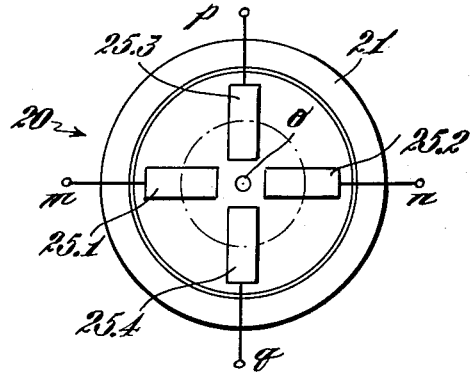
Figure 5:
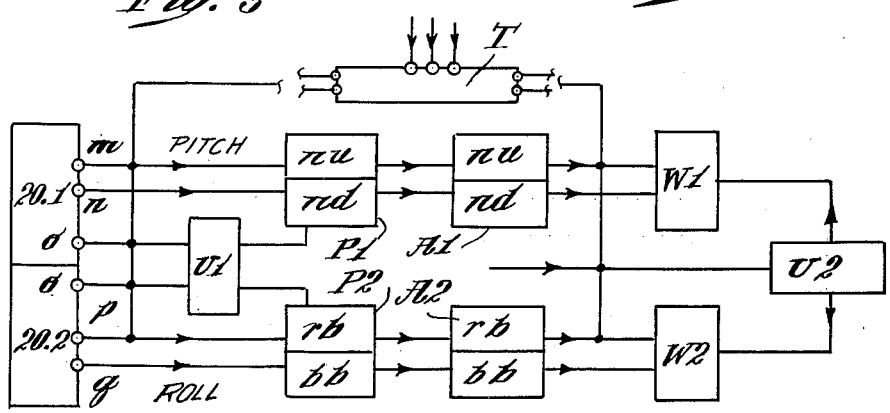
FIG. 5 is a block diagram which represents schematically a complete installation to which the invention is applied.

FIG. 5 is a greatly simplified diagram of the system as a whole wherein blocks 20.1 and 20.2 indicate gravity responsive position detecting and signal transmitting means such as represented by the terminals $m, o, n$ and $p, o, q$ which correspond to the terminals of FIGS. 2 to 4. A phase splitting transformer system T converts three-phase current into two-phase current in the manner to be described more in detail below. Split phase current is fed to the torque motor windings which are indicated at W1 and W2, as well as to the signal senders 20.1, 20.2, to the amplifiers A1, A2 and to the phase detectors P1 and P2. Voltage reference systems U1 and U2 feed into the position detecting signal means 20.1, 20.2 as well as into the erection torque components. Assuming that the system is incorporated in an aeronautical device, the components are separated into nose up, nose down and right bank and left bank elements which are correspondingly indicated by the legends *nu, nd, rb* and *lb* respectively. The signal means feed into the phase detectors and amplifiers, and the torque motor control windings are supplied either from the senders 20, or directly from the power supply.

Figure 6:
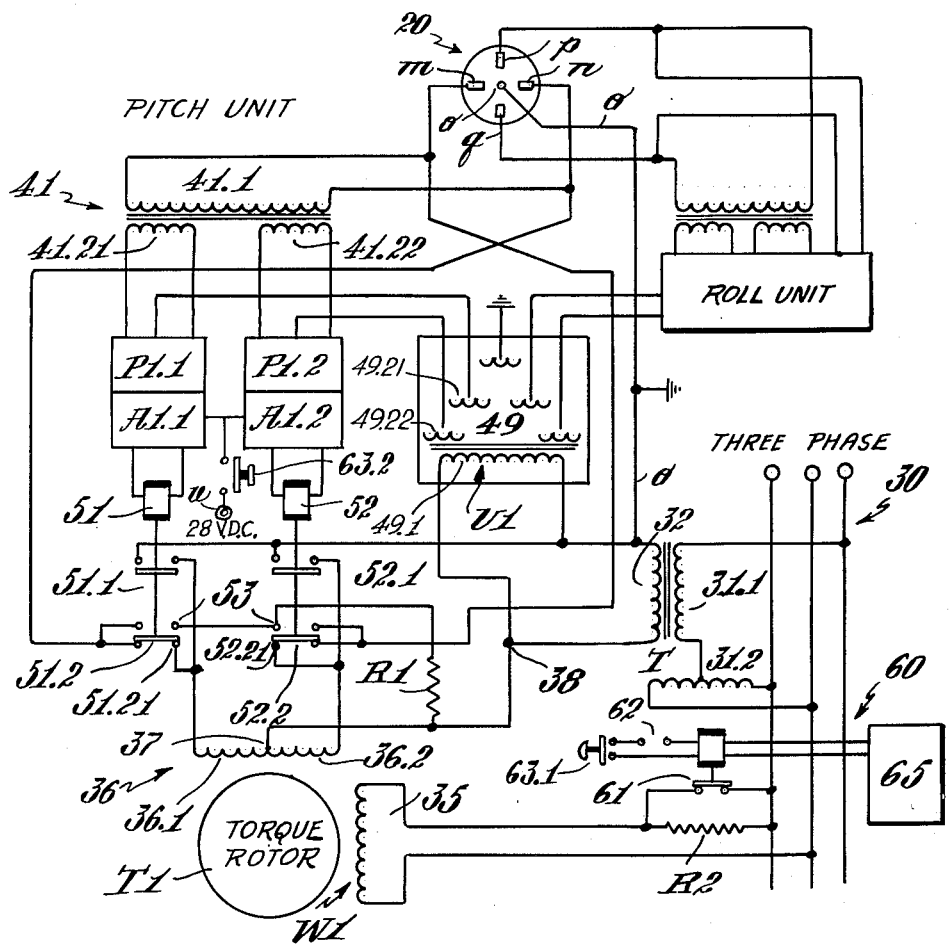
FIG. 6 is a diagram of the control circuit according to the invention with the phase discriminating amplifying units indicated as blocks without detailed circuitry.

FIG. 6 is a somewhat more detailed schematical representation of the system, and for the sake of simplicity it is confined to the pitch responsive units which are indicated at 20.1, P1, A1, and W1 of FIG. 5, although the roll units are schematically indicated by a single correspondingly labeled block.

In FIG. 6, the vertical reference detector of the type described above with reference to FIGS. 3 and 4 is indicated at 20, the pitch responsive component 20.1 being represented by the terminals $m, n,$ and the roll responsive component 20.2 by the terminal $p, q$. As mentioned above the pitch and roll units are identical and only the pitch unit will be described in detail.

A standard three phase current supply system is indicated at 30 and to this is connected a standard two-phase to three-phase transformation system T of conventional design, such as a "Scott transformer" with windings 31.1, 31.2 and 32. The secondary 32 has terminals 38 and $o$. A torque motor such as indicated by rotor T1 and windings W1 of FIG. 1 has a reference winding 35 and a control winding 36 with a midpoint 37 which is connected to the reference terminal 38 of the Scott transformer and therefore subdivides the winding 36 into a winding 36.1 and a winding 36.2 carrying alternating current of opposite phase. The other terminal of the Scott transformer secondary 32 is grounded at $o$. The two control windings halves 36.1 and 36.2 carrying alternating current of opposite phase will, in cooperation with winding 35, exert upon energization torques in opposite direction and it will be evident that the maximum torque in one or the other direction will be exerted if the other winding half is de-energized. The terminals of the signal sender or detector, in this instance $m$ and $n,$ are in two branches (through switches 52.2, 51.2) and torque motor control windings 36.2 and 36.1 connected to terminal 38 of the secondary 32, and also to the terminals of primary 41.1 of the signal transformer 41. The secondaries 41.21 and 41.22 of the transformer 41 feed into amplifiers A1.1 and A1.2, respectively, which correspond to those marked *nu* (nose up) and *nd* (nose down) in FIG. 5. The blocks A1.1 and A1.2 of FIG. 6 also include the phase detector components P1. The components A and P will be described in detail hereinbelow with reference to FIG. 7.

The output terminals of the amplifiers are connected to relay solenoids 51, 52 which actuate the normally open fast erection switches 51.1 and 52.1 and the transfer switches 51.2 and 52.2, respectively. The switches 51.1 and 52.1 lead from the respective end terminals of the control windings 36.1 and 36.2 to terminal $o$ of the supply secondary 32 so that when switch 51.1 is closed and 52.1 open, winding 36.1 is directly supplied from 32 and vice-versa, if 52.1 is closed and 51.1 open, winding 36.2 receives current directly from 32. The normally closed transfer contacts 51.21 and 52.21 lead from terminals $n$ and $m$ to the outer terminals of the torque motor control windings 36.1 and 36.2, respectively. The normally open contacts 53, when transferred, connect the artificial load resistor R1 to the terminals $n$ and $m,$ respectively.

A damping and erection rate adjusting resistor R2 is arranged in series with the reference winding 35 and is normally shunted by means of the break switch 61 of a relay device 60 which is suitably energized from a current supply at 62 if the switch 63.1 is closed. The switch 63.1 can be manually operated, or the relay can be actuated by time relays or other means indicated at 65, that can be made dependent upon the operation of the system as a whole.

The voltage reference circuit U1 which is indicated in FIGS. 5 and 6 will be explained as to its construction and function with reference to FIG. 7.

The above described circuitry is assumed to relate to the pitching motion of the gyro spin axis, whereas the rolling motion, which initiates the signals delivered at terminals $p, q$ of the reference switch 20, is taken care of by a circuit which, as mentioned above, is identical to that just described.

*The phase responsive amplifiers*

Figure 7:
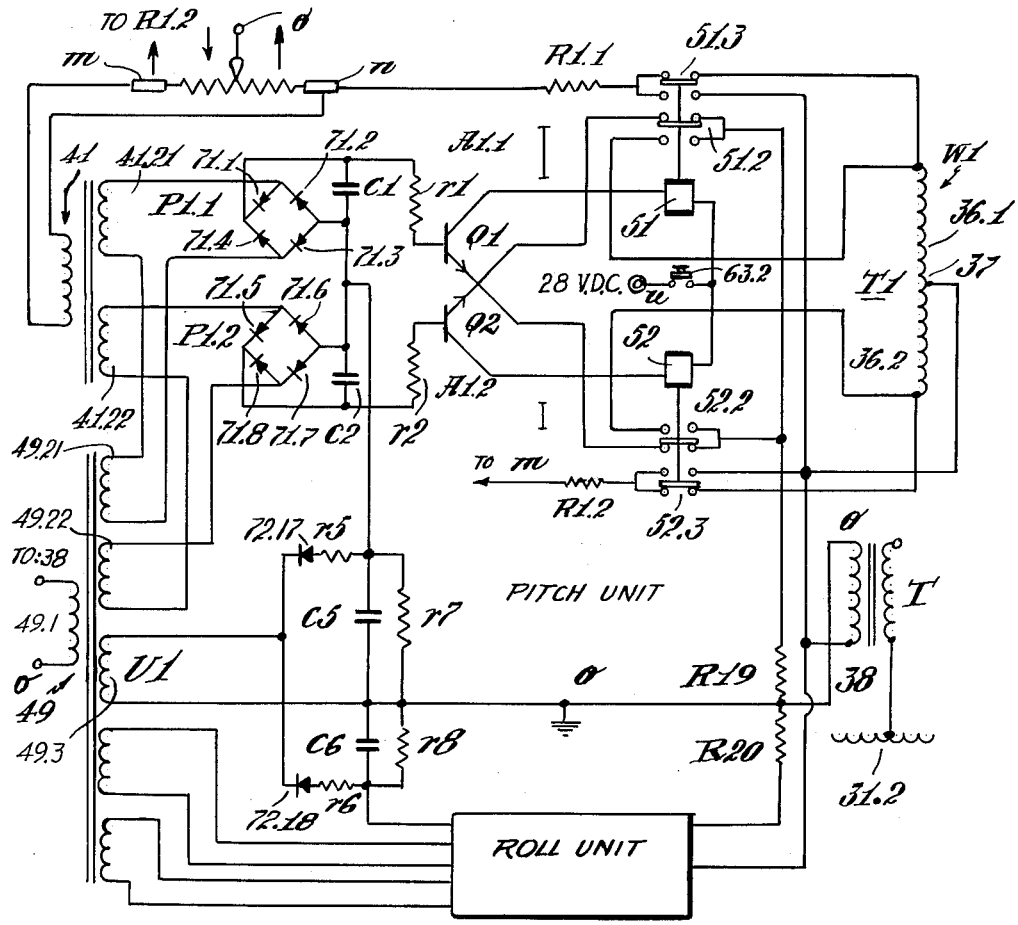
FIG. 7 shows the detailed circuitry of one of the amplifying units.

FIG. 7 shows in detail the component circuits which constitute the phase control and amplifier circuits P1.1, P1.2 and A1.1, A1.2 of FIGS. 5 and 6. FIGS. 7 clearly indicates the relation of these component circuits to the device as a whole by way of the reference characters which are applied to corresponding components and terminals. The only difference between FIGS. 6 and 7 is a modification of the artificial load circuit with resistor R1 of FIG. 6 which is in FIG. 7 divided into two resistor R1.1 and R1.2 which are connected between the respective signal means terminals $n, m$ and the double throw switches 51.3 and 52.3 which replace the normally open switches 51.1 and 52.1 of FIG. 6. A direct current supply of 28 volts is used in this particular embodiment, as indicated at $u$ of FIG. 7.

Figure 9:
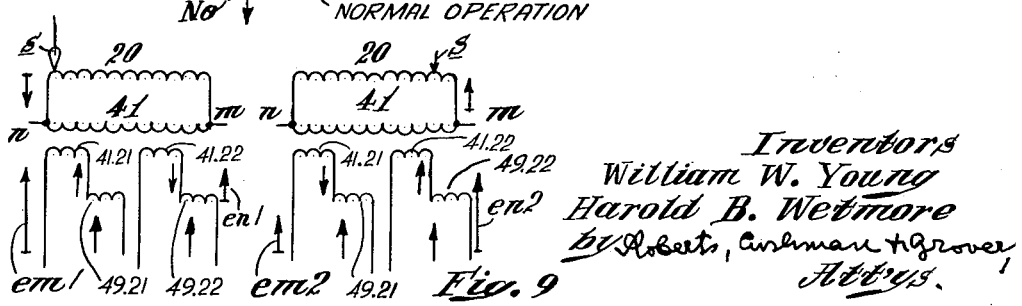
FIG. 9 is a diagram illustrating the operation of the circuit according to FIG. 7.

The voltage reference circuit U1 comprises a transformer 49 with primary 49.1 and five secondaries two of which namely 49.21 and 49.22 are labeled in FIGS. 6, 7 and 9 as part of the pitch unit whose operation will be specifically described. The secondary 49.3, the rectifiers 72.17 and 72.18, the resistors $r5, r6, r7, r8$ and the capacitors C5, C6 are part of a conventional rectifier unit of the voltage reference circuit U1.

The nature and the electrical connections of the elements of each one of these circuit components are clearly shown in FIG. 7, whereas the exact structural characteristics or dimensions and ratings, so far as material for the proper operation of the device, are identified in the following list which refers to numerals of FIG. 7 it being understood that adjustments and mutual correlations have to be applied upon initial testing for proper performance, according to routine practice in the manufacture of devices of this type.

Rectifiers:
71 _____ 1N89.
72 _____ 1N89.
Transistors Q1, Q2 _____ 2N117.
Capacitors:
   C1, C2 _____ 0.1 µf. 100v.
   C5, C6 _____ 0.1 µf. 100v.
Resistors:
   $r1, r2$ _____ 68K ½w.
   $r5, r6$ _____ 4.7K ½w.
   $r7, r8$ _____ 27K ½w.
   R19 _____ 180 ohm 1w.
   R20 _____ 68 ohm 1w.

*Operation*

Figure 8:
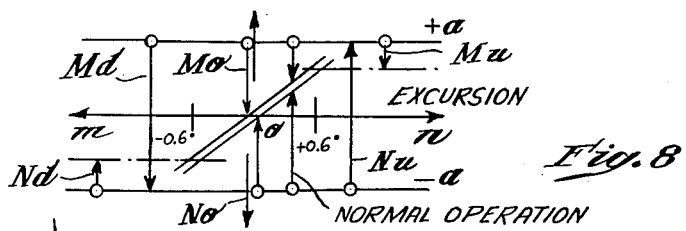
FIG. 8 is a diagram indicating the character of the signals applied by the position sensitive signal means.

The phase and amplitude relations of the signal currents will first be explained with reference to FIG. 8. In this figure the horizontal axis represents the excursions of the position indicator whereas the vertical axis represents the A.C. voltages. Referring for the sake of simplicity to a reference device according to FIG. 2, it will be evident that the impedance $i,$ here a resistance, can be represented by the oblique line which intersects the origin and ends at the extreme excursion of contact $s,$ for example at +0.6° and −0.6° as indicated in FIG. 8. Thus, if the contact $s$ of FIG. 2 is at the end $m$ of the resistor, and assuming that the alternating current amplitude is represented by the distance of the horizontal lines $+a$ and $-a$, then the current between $m$ and $o$ can be represented by the vector $Md$ whereas the current flowing between $n$ and $o$ can be represented by the vector $Nd$. Assuming that the device according to FIG. 2 swings in a plane perpendicular to the axis of pitching rotation then these vectors represent the nose down excursions. Analogous values prevail for nose up excursions as indicated on the right-hand side at $Mu$, $Nu$. It will be further evident that the A.C. phases on the respective sides of $s$ are in opposition, as likewise indicated in FIG. 8. Thus, with the contact $s$ in the intermediate position the two vectors $Mo$ and $No$ are equal and opposite.

It should be remembered at this point that the amplifier and relay systems are so dimensioned that the energization of the torque motor control windings will take place in conventional manner within a given range of excursion whereas, if one or the other vector, depending on the direction of excursion, exceeds a predetermined value, the direct fast energization according to the invention will come into effect while the conventional energization of the windings is locked out.

The description of the operation of the system as a whole will be facilitated by first explaining that of the phase discriminating amplification system according to FIG. 7, and in this context it should be understood that this amplification system can be replaced by systems which accomplish the same general purpose in a different manner.

As indicated by arrows in FIGS. 7 and 9 the secondaries 41.21, 41.22, 49.21 and 49.22 are connected in series such that their E.M.F. values add and subtract respectively, and it will be understood that the phase relations of the alternating currents in these windings are coordinated by conventional expedients to accomplish that effect. The E.M.F.'s in the secondaries 49.21, 49.22 of the voltage reference unit U1 are constant and in phase, whereas the E.M.F.'s of the amplifier secondaries 41.21, 41.22 are in opposition and equal only if the reference switch, represented by contact $s$, is in neutral position. The addition and subtraction of alternating current vectors indicates the direction of deviation since obviously the alternating current corresponds to a smaller detector impedance will have a considerably greater amplitude than that which corresponds to the other branch of the impedance $i$. It will be further evident that, in the arrangement according to FIG. 7, the current in load resistor $r1$ will be greater than in $r2$, or vice-versa, if the contact $s$ of the signal means impedance $i$ is nearer one or the other of the terminals $n$ or $m$ respectively. In this manner the amplifying device discriminates between the two directions of positional change, in this instance corresponding to nose up or nose down pitching. Thus, in the circuitry according to FIGS. 6 and 7 it can be assumed that with contact $s$ near $n$, the rectified current at $r1$ will be greater than that at $r2$, whereas the relation is reversed when $s$ is near $m$ so that, with nose up the solenoid 51 will receive considerably more energy than solenoid 52 whereas with nose down solenoid 52 receives more energy than 51.

FIG. 9 indicates this operation for opposite excursions of $s$ by way of the vectors for the respective positions of $s$. With $s$ near $n$, the vector $em1$ is greater than $en1$, and with $s$ near $m$, the vector $em2$ is smaller than $en2$.

The relay actuating solenoids 51 and 52 are so constructed that they respond only if the energy supplied thereto surpasses a given value, so that for example in the first mentioned instance, with nose up, solenoid 52 will never respond whereas 51 will respond if the current in $r1$ will be greater than the predetermined value.

The functioning of rectifiers 71 and of transistors Q is conventional and does not require specific explanation.

Coming now to the operation of the device as a whole, the circuit will be in the condition indicated in FIG. 6 when the spin axis is in normal position or the deviation is small enough such that the above mentioned energy value at which one or the other of the relays 51 or 52 response is not yet reached. In that condition the switches are in the position shown in FIG. 6 and the control windings of the torque motor are energized directly from terminals $m$, $n$ and operate in conventional manner.

If the deviation of $s$ exceeds a given value say $+0.3°$ or $-0.3°$ one or the other of the relays will be energized due to the direction discriminating amplifier such as described above with reference to FIGS. 6 and 7 and one or the other sets of switches will change position. Assuming by way of example that solenoid 51 is energized (which as pointed out above would correspond to a nose up pitching movement of the spin axis of the gyroscopic system), switch 51.1 closes and switch 51.2 transfers contact from 51.21 to contact 53. Relay 52 being not energized, the closing of switch 51.1 establishes a connection from terminal $o$ directly to the outer terminal of control winding section 36.1 of the torque motor; the control winding half 36.1 is thus directly connected between the terminals $o$ and 38 of the secondary 32 of motor supply transformer T. The transfer of switch 51.2 connects the terminal $n$ directly to the switch terminals 53 and thus establishes a direct connection from $n$ through the resistor R1 to terminal 38 of transformer 32. The relays thus constitute lock out means for the reference impedance, during abnormal operation.

Thus, for superfast erection taking place upon an excessive excursion and the closing of switch contacts 63.2 the normal operation (with the switches in the position shown in FIG. 6 and with the control windings supplied directly from the signal means) is changed over to the one just described with one or the other of relays 51 or 52 energized and the other de-energized, with one of the control winding halves connected to the high impedance side of the reference switch and the other directly on the secondary 32, and with the then inactive branch of the reference impedance $i$ connected to 32 in series with R1 as an artificial load. In this manner the torque motors will be operated for short intervals of time under their maximum torque output condition, namely with one half of the control winding effectively open and the other directly on the power supply, and with the inactive side of the detector impedance feeding into the resistor R1 and thus virtually removed as a controlling component. In this manner an on-off reversing servo system is obtained with the change over point occurring as close to the zero output or vertical condition of the deviation detector as is desired for any particular system.

The operation of the resistors R1.1 and R1.2 as shown in FIG. 7, analogous to that of R1 of FIG. 6, will be evident from the above description of that figure.

If superfast erection systems of the above described type are applied to typical vertical gyroscope systems under operating conditions such as when the gyroscope rotor has not yet reached its full operating momentum, then oscillation of the gimbal system about its vertical position can occur due to the time constants of the system elements. In such cases, if the oscillations are of a magnitude requiring attention, they can be minimized or eliminated as required, by insertion of a resistor R2 as shown in FIG. 6 into the reference winding circuit 35 of the torque motor. This resistor is normally short circuited by a switch 61, and can be opened either by manual or electric switching, as indicated in FIG. 6. A time delay or other program can be imparted to this operation, as indicated at 65 of FIG. 6 which block is intended to represent any suitable electric switching function for operating the switch 61, which can also be opened at will by means of the manually operated switch 63.1. This arrangement which incorporates resistor R2 can also be used to provide adjustment of the rate of superfast erection, as may also be accomplished for the two axes independently of one another, by adjustment of the values of resistors R19 and R20 in the control winding circuit.

It will now be evident that, when the amplifiers of the present system are not in operation and do not consume power, this system incorporates all the desirable features of simple torque motor systems which depend wholly on detector impedance under normal erection conditions. This condition of normal operation prevails under most circumstances through about 95% of its operating life. During such normal operation it is desirable that the torques which are applied to the gimbal axes are proportional to small angle excursions of the detector and it is further desirable that this control is obtained without amplifiers of other complex auxiliaries and with low power consumption. These requirements are fully complied with by the present invention. Beyond that, the fast erection operation according to the invention is carried out under maximum torque output conditions obtained by means of elementary relays and comparatively simple and very reliable phase discriminatory amplifiers for these relays. The simple solid diode rectifier bridges and simple transistor amplifiers according to FIG. 7, for all four channels of a vertical gyro, actually fit into a space of less than two cubic inches, are much lighter, much less expensive and much more reliable than the previously used amplifiers for the entire range of erection including fast erection. In comparison with such known amplifying systems, the present switching circuitry is extremely simple and reliable. Furthermore, the power consumption of the switching amplifiers in the present systems (whether they be of the herein described type or of the saturated core or vacuum tube types) is very low as compared with those that are necessary in systems which employ low power signals that must be amplified electronically by means of highly developed and relatively large, heavy, complex and closely controlled equipment which is of necessity heavier and larger than the gyro proper which it controls. Furthermore, the previously known systems do not provide for artificial detector signal loads or for anti-oscillation and rate adjusting arrangements in addition to normal erection control of torque motors directly from a vertical reference device with automatic transition from normal to superfast erection and vice-versa, and with maximum efficiency during the fast erection period.

We claim:

1. In combination with a polyphase electric motor having two direction control windings: signal delivering means of the variable impedance type normally operative to deliver a preponderance of current directly to one or the other of said control windings respectively, to determine the presence and direction of motor torque; and means operative to supply current at a voltage, higher than that normally delivered by the signal means, to one or the other of said direction control windings, said current supply means including discriminatory means for furnishing said higher supply current voltage upon direct delivery thereto of a current preponderance exceeding a predetermined value; whereby the motor develops, upon energization of said higher voltage current supply means, an abnormally high torque, independently of the signal delivering means, after the directly delivered preponderance of current has reached a value insufficient to provide a predetermined torque.

2. In combination with a polyphase electric motor having two direction control windings: signal delivering means of the variable impedance type normally operative to deliver a preponderance of current directly to one or the other of said control windings respectively, to determine the presence and direction of motor torque; and relay means operative to supply current at a voltage, higher than that normally delivered by the signal means, for abnormal operation to a first one of said direction control winding, said current supply means including discriminatory means for furnishing said higher supply current voltage upon direct delivery thereto of a current preponderance exceeding a predetermined value, said relay means including means for disconnecting the signal delivery to the other one of said direction control winding substantially concomitantly with the beginning of delivery to the first winding of current at higher voltage; whereby the motor develops, upon energization of said higher voltage current supply means, an abnormally high torque, independently of the signal delivering means, after the directly delivered preponderance of current has reached a value insufficient to provide a predetermined torque, and whereby the function of the abnormally operated winding is unimpeded by energy supplied to the other winding.

3. In combination with a polyphase electric motor having a reference winding and two direction control windings: a torque control device of the variable impedance type normally operative to supply alternating current of different phase to said control windings, respectively, such as to maintain a predetermined torque varying from a torque in one direction through zero to a torque in the other direction, dependent on the delivery of a preponderance of alternating current of respective phase directly to one or the other of said control windings respectively; relay actuated switch means controlled by said torque control device operative upon energization above a predetermined degree to supply current at a voltage higher than that capable of being directly delivered by said torque control device, to one or another of said control windings, respectively; and means for amplifying currents derived from said alternating currents which are supplied to said control windings, one amplifying means for each control winding, for supplying current to energize said switch means when said preponderance of alternating current has reached a predetermined value corresponding to said predetermined degree of energization; whereby the motor develops an abnormally high torque, independently of the signal delivering means, after the directly delivered preponderance of current has reached a value insufficient to provide a desired torque.

4. In combination with a polyphase electric motor having a reference winding and two direction control windings: a torque control device of the variable impedance type normally operative to supply alternating current of different phase to said control windings, respectively, such as to maintain a predetermined torque varying from a torque in one direction through zero to a torque in the other direction, dependent on the delivery of a preponderance of alternating current of respective phase directly to one or the other of said control windings respectively; relay actuated switch means controlled by said torque control device operative upon energization above a predetermined degree to supply current at a voltage higher than that capable of being directly delivered by said torque control device, to one or another of said control windings, respectively; means for diminishing the current supply to one of said control windings upon said energization above a predetermined degree to the other control winding; means for amplifying currents derived from said alternating currents which are supplied to said control windings, one amplifying means for each control winding, for supplying current to energize said switch means when said preponderance of alternating current has reached a predetermined value corresponding to said predetermined degree of energization; whereby the motor develops an abnormally high torque, independently of the signal delivering means, after the directly delivered preponderance of current has reached a value insufficient to provide a desired torque, and whereby the high torqque is not impeded by a counteracting normal torque.

5. A gyroscopic device having two axes of gimbal freedom and a spin axis that is normally parallel to the gravity vector, comprising: a torque motor associated with an axis of gimbal freedom for erecting the spin axis into said vector after deviation therefrom, said motor being of the two-phase, reversible type having a reference winding and two direction control windings; a gravity reference variable impedance means operative normally to supply to one or the other of said control windings a preponderance of energy thereby to cause the motor to deliver a torque in one direction or the other; means operative to render said reference impedance means ineffective with respect to said control windings when said preponderance of energy reaches a predetermined value; and means operative while the reference impedance means is ineffective to supply energy greater than said value to the control winding which had last received said preponderance of energy; whereby a signal delivered by the reference impedance means when the latter becomes ineffective causes the motor to deliver a torque in the desired direction at a higher than normal rate.

6. A gyroscopic device having two axes of gimbal freedom and a spin axis that is normally parallel to the gravity vector, comprising: a torque motor associated with an axis of gimbal freedom for erecting the spin axis into said vector after deviation therefrom, said motor being of the two-phase, reversible type having a reference winding and two direction control windings; a gravity reference variable impedance means operative normally to supply to one or the other of said control windings a preponderance of energy thereby to cause the motor to deliver a torque in one direction or the other; means operative to render said reference impedance means ineffective with respect to said control windings when said preponderance of energy reaches a predetermined value; means operative while the reference impedance means is ineffective to supply abnormal energy greater than said value to the control winding which had last received said preponderance of energy; and means for making the circuit of the other control winding ineffective while said abnormal energy is supplied to the first control winding; whereby a signal delivered by the reference impedance means when the latter becomes ineffective causes the motor to deliver a torque in the desired direction at a higher than normal rate.

7. In a gyroscopic system wherein deviation of the spin axis from the vector of a reference field is corrected by torques applied to gimbal means and controlled by a field reference impedance, fast erection apparatus comprising: field reference means including field responsive means which manifest deviations of said spin axis from the field vector, and variable impedance means controlled by said field responsive means to furnish two alternating current signals which are, for small angles of deflection on either side of the field vector complemental with reference to a variable control juncture position of said variable impedance means, proportional to said angles but which remain essentially constant for greater angles, and which signals are of essentially opposite phase; torque motor means coupled to said gimbal axis means of the system having a reference winding and having two control windings on either side of an intermediate tap, for varying the direction and amount of torque applied to the gimbal means; means for supplying to said control windings the respective alternating current signals from said variable impedance means, in parallel branches between said control juncture and said tap; and two phase responsive relays energized from said variable impedance means such that they respond to said alternating currents of opposite phase and each having a switch means which is actuated when the relay energizing current of the respective phase exceeds a predetermined value above said constant signal value for greater angles of deflection, each switch means having normally closed contact means for normally feeding said signals directly to said control windings, and normally open contact means which are adapted to connect to the respective half of said control winding, an independent fast erection voltage source upon energization of a respective relay.

8. In a gyroscopic system wherein deviation of the spin axis from the vector of a reference field is corrected by torques applied to gimbal means and controlled by a field reference impedance, fast erection apparatus comprising: field reference means including field responsive means which manifest deviations of said spin axis from said field vector, and variable impedance means controlled by said field responsive means to furnish two alternating current signals which are for small angles of deflection on either side of the field vector complemental with reference to a variable control juncture position of said variable impedance means, proportional to said small angles but which remain essentially constant for greater angles, and which signals are of essentially opposite phase; torque motor means coupled to said gimbal means of the system having a reference winding and having two control windings on either side of an intermediate tap, for varying the direction and amount of torque applied to the gimbal means; means for supplying to said control windings the respective alternating current signals from said variable impedance means, in parallel branches between said control juncture and said tap; two phase responsive relays energized from said variable impedance means such that they respond to said alternating currents of opposite phase and each having a switch means which is actuated when the relay energizing current of the respective phase exceeds a predetermined value above said constant signal value for greater angles of deflection, each switch means having normally closed contact means for normally feeding said signals directly to said control windings, and normally open contact means which are adapted to connect to the respective half of said control winding an independent fast erection voltage source, upon energization of a respective relay; artificial load impedance means; and two normally open contact means, operated by respective relays, for connecting said artificial load impedance means upon actuation of said switch means across that section of said variable impedance means that carries the current which is below said predetermined value.

9. In a gyroscopic system wherein deviation of the spin axis from the vector of a reference field is corrected by torques applied to gimbal means and controlled by a field reference impedance, fast erection apparatus comprising: field reference means including field responsive means which manifest deviations of said spin axis from said field vector, and variable impedance means controlled by said field responsive means to furnish two alternating current signals which are for small angles of deflection on either side of the field vector complemental with reference to a variable control juncture position of said variable impedance means, proportional to said small angles but which remain essentially constant for greater angles, and which signals are of essentially opposite phase; torque motor means coupled to said gimbal means of the system having a reference winding and having two control windings on either side of an intermediate tap, for varying the direction and amount of torque applied to the gimbal means; means for supplying to said control windings the respective alternating current signals from said variable impedance means, in parallel branches between said control juncture and said tap; two phase responsive relays energized from said variable impedance means such that they respond to said alternating currents of opposite phase and each having a switch means which is actuated when the relay energizing current of the respective phase exceeds a predetermined value above said constant signal value for greater angles of deflection, each switch means having normally closed contact means for normally feeding said signals directly to said control windings, and normally open contact means which are adapted to connect to the respective half of said control winding an independent fast erection voltage source, upon energization of a respective relay; a damping resistor; and means for connecting said damping resistor to said reference winding of said torque motor means.

10. In a gyroscopic system wherein deviation of the spin axis from the vector of a reference field is corrected by torques applied to gimbal means and controlled by a field reference impedance, fast erection apparatus comprising: field reference means including field responsive means which manifest deviations of said spin axis from said field vector, and variable impedance means controlled by said field responsive means to furnish two alternating current signals which are, for small angles of deflection on either side of the field vector complemental with reference to a variable control juncture position of said variable impedance means, proportional to said angles but which remain essentially constant for greater angles, and which signals are of essentially opposite phase; a transformer primary in series with said variable impedance means; torque motor means coupled to said gimbal means of the system having a reference winding and having two control windings on either side of an intermediate tap, for varying the direction and amount of torque applied to the gimbal means; means for supplying to said control windings the respective alternating current signals from said variable impedance means, in parallel branches between said control juncture and said tap; two source of substantially constant and in phase alternating reference voltages; two relay secondaries coupled to said primary such that voltages of opposite phase are induced therein; two amplifying means; two relay actuating means which respond to said alternating current signals of opposite phase and each having a switch means which is actuated when the relay energizing current of the respective phase exceeds a predetermined value above said constant signal value for greater angles of deflection, each switch means having normally closed contact means for normally feeding said signals directly to said control windings, and normally open contact means which are adapted to connect to the respective half of said control winding an independent fast erection voltage source, upon energization of a respective relay; conductor means for forming two comparing circuits each including load means and in series therewith one of said reference voltage sources and one of said relay secondaries, and one of said amplifying means connected to said load means and feeding into one of said relay actuating means; whereby one or the other one of the relay actuating means will respond when the voltage and phase of a respective relay secondary has a predetermined relation to voltage and phase of the reference sources to supply the fast erection voltage.

11. In a gyroscopic system wherein the deviation of the spin axis from the gravity vector is corrected by means of a torque applied to a gimbal means and controlled by a gravity responsive regulator, erection apparatus comprising: a rheostat which is fixed relatively to said spin axis and which has two end terminals and an intermediate contact whose position depends on the inclination of the spin axis relatively to the gravity vector such that the ratio of the resistance parts between said intermediate contact and said end terminals is defined by the inclination of the spin axis; torque motor means adapted for coupling to a shaft of said gimbal means and having a control winding and a reference winding for applying a torque to said gimbal shaft, said control winding having two portions between an intermediate tap and two end terminals, respectively; an alternating current source; an artificial load impedance connected to one side of said source; means for supplying to said rheostat and to said control winding alternating current from said source in two parallel branches between said intermediate contact and said intermediate tap each branch containing a part of said rheostat and a portion of said control winding; a transformer whose primary is connected on one side to one each of said end terminals of the rheostat and the control winding and on the other side to the two remaining ones of said end terminals; two solenoids connected in parallel to the secondary of said transformer; an amplifier which is responsive to the phase of one half of said control winding, connected between the other solenoid and said secondary; an amplifier which is responsive to the phase of the other half of said control winding, between the other solenoid and said secondary; two erection switches operated by respective solenoids, each erection switch having normally open contacts which are directly connected between said alternating current source and a respective end terminal of said control winding, through said intermediate tap, and two transfer switches operated by respective solenoids, each transfer switch having a normally open contact adapted to connect the other side of said load impedance to a respective end terminal of said rheostat, and a normally closed contact connecting a respective end terminal of said control winding to a respective end terminal of said rheostat, solenoids retaining said switches in said normal positions so long as the current in the respective branch of said rheostat is below a predetermined value corresponding to a selected position of said intermediate rheostat contact; whereby said solenoids respond only when said intermediate contact has reached a point corresponding to a predetermined range of proportional control winding energization, whereas a respective solenoid operates its switches when said range is exceeded whereupon said source is directly connected to the respective control winding half whereas the rheostat section that is within said range is directly connected to said artificial load impedance.

12. A gyroscopic device having two axes of gimbal freedom and a spin axis that is normally parallel to the gravity vector, comprising: motor means associated with an axis of gimbal freedom for erecting the spin axis into said vector after deviation therefrom; a gravity reference variable impedance means operative normally to supply to said erecting motor means a preponderance of energy thereby to cause the motor means to deliver a torque in one direction or the other; lock out means for rendering said reference impedance means ineffective with respect to said motor means, said lock out means including means for making the lock out means operative when said preponderance of energy reaches a predetermined value; and means controlled by said reference impedance means for supplying, while the reference impedance means is ineffective, energy greater than said predetermined value to the motor means for delivery of a torque in the direction corresponding to said preponderance of energy; whereby a signal delivered by the reference impedance means when the latter becomes ineffective causes the motor means to deliver a torque in the desired direction at a higher than normal rate.

13. Device according to claim 12, wherein said erecting motor means includes a torque motor associated with said axis of gimbal freedom and being of the two-phase, reversible type having a reference winding and two direction control windings, and which further comprises means for supplying from said gravity reference variable impedance means a preponderance of alternating current energy to one or the other of said control windings for supplying the energy greater than said predetermined value.

References Cited in the file of this patent

UNITED STATES PATENTS

| | | |
|---|---|---|
| 2,720,116 | Furst | Oct. 11, 1955 |
| 2,728,039 | Dueringer | Dec. 20, 1955 |
| 2,817,975 | Granquist | Dec. 31, 1957 |
| 2,919,404 | Rock | Dec. 29, 1959 |